(12) United States Patent
Hoogerwerf et al.

(10) Patent No.: US 8,819,593 B2
(45) Date of Patent: Aug. 26, 2014

(54) FILE MANAGEMENT USER INTERFACE

(75) Inventors: Scott D. Hoogerwerf, Seattle, WA (US);
Aryeh N. Polsky, Seattle, WA (US);
Rolf A. Ebeling, Kirkland, WA (US);
Benjamin A. Betz, Redmond, WA (US);
Christopher J. Guzak, Kikrkland, WA (US); Brendan M. Dohm, Seattle, WA (US); Michael J. Gilmore, Bothell, WA (US); Arun Gurunathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 137 days.

(21) Appl. No.: 12/945,529

(22) Filed: Nov. 12, 2010

(65) Prior Publication Data

US 2012/0124502 A1    May 17, 2012

(51) Int. Cl.
*G06F 3/048* (2013.01)
*G06F 17/30* (2006.01)

(52) U.S. Cl.
USPC .......... 715/854; 715/771; 715/781; 715/804; 707/754; 707/767

(58) Field of Classification Search
CPC ..... G06F 3/048; G06F 3/0481; G06F 3/0483; G06F 9/4443; G06F 3/0482; G06F 17/30994; G06F 17/30; G06F 17/30516; G06F 17/30672; G06F 17/30424; G06F 17/30699; G06F 17/30867; G06F 17/30477; G06F 17/30864

USPC .......... 715/771, 781, 804, 854; 707/E17.014, 707/754, 767
See application file for complete search history.

(56) References Cited

U.S. PATENT DOCUMENTS

| | | | |
|---|---|---|---|
| 6,738,973 B1* | 5/2004 | Rekimoto | 718/104 |
| 7,343,587 B2* | 3/2008 | Moulden et al. | 717/124 |
| 2002/0075312 A1* | 6/2002 | Amadio et al. | 345/764 |
| 2003/0126136 A1 | 7/2003 | Omoigui | |
| 2004/0252604 A1 | 12/2004 | Johnson et al. | |
| 2006/0004692 A1* | 1/2006 | Kaasten et al. | 707/1 |
| 2006/0212455 A1* | 9/2006 | Perry et al. | 707/100 |
| 2006/0242122 A1* | 10/2006 | DeVorchik et al. | 707/3 |
| 2006/0271558 A1 | 11/2006 | Makela et al. | |
| 2008/0201315 A1 | 8/2008 | Lazier et al. | |

OTHER PUBLICATIONS

"Ektron cms400.net Administrator Manual", Retrieved at<<http://www.beaumount.ie/WorkArea/documents/adminmanual.pdf>>, Jul. 17, 2006, pp. 849.

(Continued)

*Primary Examiner* — Boris Pesin
*Assistant Examiner* — Rinna Yi
(74) *Attorney, Agent, or Firm* — Sung Kim; Andrew Sanders; Micky Minhas (57) ABSTRACT

File management user interface techniques are described. In one or more implementations, properties of a file are displayed in a user interface by a computing device. In response to selection of a particular one of the properties in the user interface, one or more representations of one or more other files that include a corresponding value of the particular property are displayed, respectively, of the file.

20 Claims, 7 Drawing Sheets

(56) References Cited

OTHER PUBLICATIONS

"Semantic File Systems", Retrieved at<<http://www.objs.com/survey/OFSExt.htm>>, Jun. 14, 1998, pp. 18.

Grosky, et al., "Content-Based Hypermedia Intelligent Browsing of Structured Media Objects", Retrieved at<<http://ieeexplore.ieee.org/stamp/stamp.jsp?arnumber=00471675>>, 1995, pp. 1336-1340.

Wolber, et al., "Associative Sources and Agents for Zero-input Publishing", Retrieved at<<http://www.iw3c2.org/WWW2004/docs/2p494.pdf>>, May 17-22, 2004, pp. 494-495.

"Foreign Office Action", Chinese Application No. 201110356714.2, (Mar. 5, 2013), 11 pages.

"Foreign Office Action", CN Application No. 201110356714.2, Nov. 26, 2013, 7 Pages.

\* cited by examiner

FILE MANAGEMENT USER INTERFACE

BACKGROUND

The amount of functionality that is available to users of computing devices is ever increasing. For example, a user may have access to a wide range of computing devices, each configured to also include a wide range of different functionality. This functionality may be provided in a variety of ways, such as through an operating system of the device, applications that are executable on the device, involve management of files stored on the device, and so on. Consequently, users may be confronted with a multitude of different techniques that may be used to access this functionality, which may make it difficult and confusing to locate particular functionality of interest. Thus, the sheer amount of this functionality may make it difficult for a user to interact with the device, which may lead to user frustration both with the device and functionality added to the device.

SUMMARY

File management user interface techniques are described. In one or more implementations, properties of a file are displayed in a user interface by a computing device. In response to selection of a particular one of the properties in the user interface, one or more representations of one or more other files that include a corresponding value of the particular property are displayed, respectively, of the file.

In one or more implementations, an input is received by an operating system to switch from execution of a first application by a computing device to execution of a second application by the computing device. In response, a search term used to perform a search using the first application is transferred to the second application through execution of the operating system by the computing device. The second application is caused to perform a search using the search term automatically and without user intervention through execution of the operating system by the computing device.

In one or more implementations, one or more computer readable storage media comprise instructions stored thereon that responsive to execution by a computing device, causes the computing device to perform operations comprising: detecting a right click of a representation of a file; responsive to the detection, displaying a menu that lists an option that is selectable to display properties of the file; in response to selection of the option, displaying a menu that lists properties of the file; and in response to selection of one said property in the user interface, displaying representations of one or more other files that include the particular property.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

The amount of functionality that is available to users of computing devices is ever increasing, so much so that location of desired functionality may be difficult and confusing to the users. For example, accommodation of additional commands in traditional hierarchical menus may involve increasing the size of the menu and well as adding levels to the menu. Thus, these traditional techniques may result in a confusing hierarchy that may be difficult to navigate.

File management user interface techniques are described. In implementations, properties of files are used to locate files of interest. For example, a user may select an option to display properties of a file, such as through a context menu option via a right click, a properties command, an "about" command, and so forth. In response, the properties of the selected file may be output in the user interface, such as author, date created, date modified, and so forth. Selection of one or more of these properties may then cause output of other files that contain a corresponding value for that property, such as files having a same author. In this way, a user may navigate through properties to locate a file of interest. Further discussion of user interface techniques involving selection of properties may be found in relation to FIGS. 2-6.

In another example, search functionality is shared between applications by an operating system. For instance, a user may enter a search term in a first application, such as a word processing application to locate a particular file, a portion of a file, and so on. If the user is unable to locate a desired item of interest, the user may select another application. In response, an operating system of a computing device that executes the first and second application may automatically provide the search term to the second application and cause the second application to perform a search. Thus, multiple searches may be efficiently performed by switching between applications to locate data of interest. Further discussion of the search techniques may be found in relation to FIG. 7.

In the following discussion, an example environment is first described that is operable to perform techniques described herein. Examples procedures are then described, which are operable in the example environment as well as in other environments. Likewise, the example environment is not limited to performance of the example procedures.

Example Environment

Figure 1:
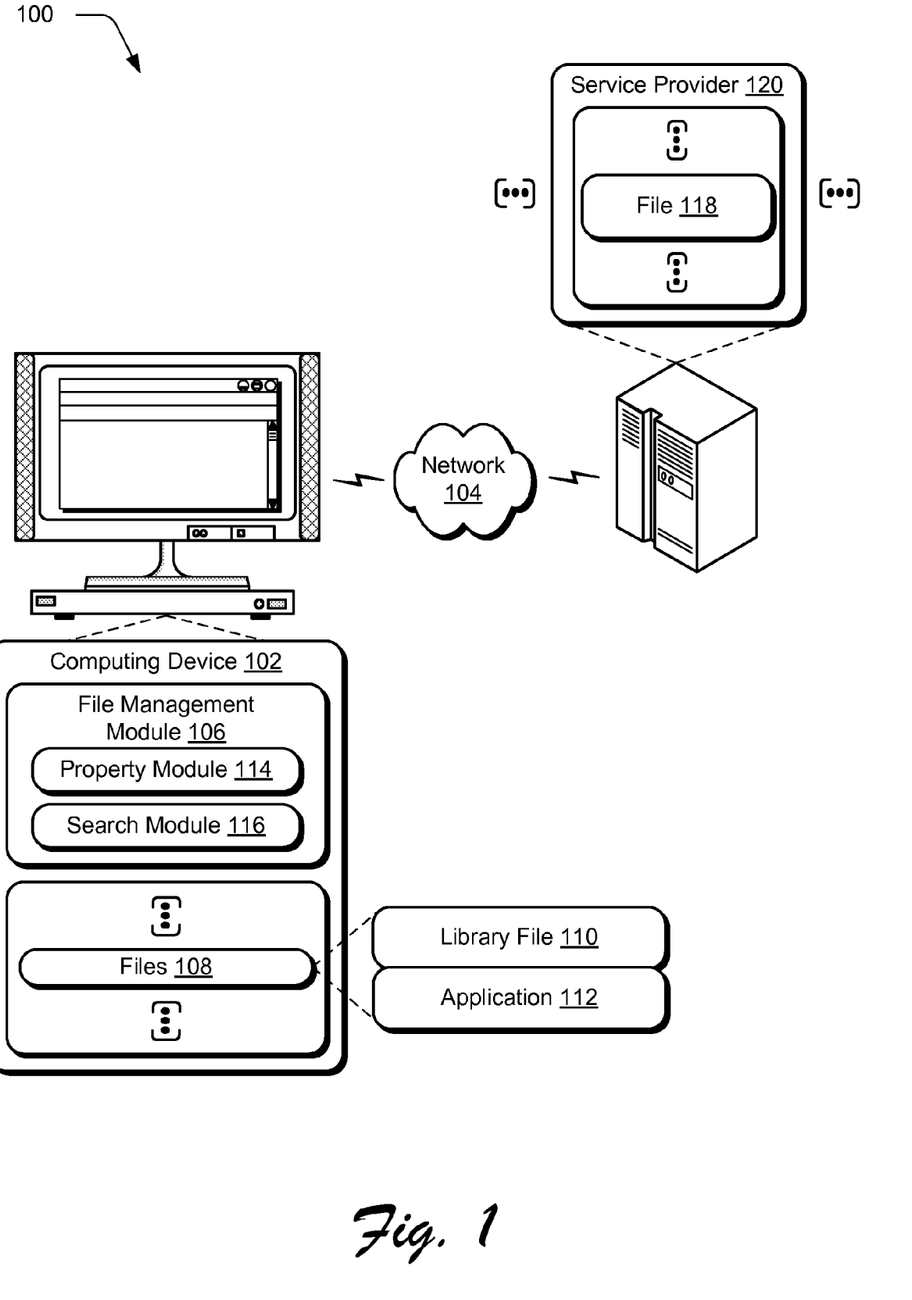
FIG. 1 is an illustration of an environment in an example implementation that is operable to perform techniques described herein.

FIG. 1 is an illustration of an environment 100 in an example implementation that is operable to employ user interface techniques described herein. The illustrated environment 100 includes a computing device 102, which may be configured in a variety of ways. For example, the computing device 102 may be configured as a computer that is capable of communicating over a network 104, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations, a remote control and set-top box combination, an image capture device and a game console configured to capture gestures, and so on.

The computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform the operations. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), optical discs, flash memory, hard disk memory, and other memory devices that may use magnetic, optical, and other techniques to store instructions and other data.

Although the network 104 is illustrated as the Internet, the network may assume a wide variety of configurations. For example, the network 108 104 include a wide area network (WAN), a local area network (LAN), a wireless network, a public telephone network, an intranet, and so on. Further, although a single network 104 is shown, the network 104 may be configured to include multiple networks.

The computing device 102 is illustrated as including a file management module 106. The file management module 106 is representative of functionality to manage files 108 by the computing device 102. A variety of different files may be managed using the file management module 106. For example, the files 108 may be configured as library files 110. Library files 110 generally refer to a unit of data that is referenced by another file that executes on the computing device 102, such as an application 112. Thus, the application 112 is an executable file that may access a library file 110 to process the data contained therein. A library file 110 may assume a variety of configurations, such as a document, plug-in, script, and so forth that may be referenced by a wide variety of different applications 112, such as a word processor, spreadsheet application, browser, operating system, and so on.

The file management module 106 is further illustrated as including a property module 114 and a search module 116. The property module 114 is representative of functionality of the file management module 106 to navigate through files using properties. The property module 114, for instance, may configure a user interface such that properties of files may be used as pivots to locate a particular file of interest. A variety of different properties of a variety of different types of files may be used as pivots, further discussion of which may be beginning in relation to FIG. 2.

The search module 116 is representative of functionality of the file management module 106 to populate a search term across applications 112. For example, the search module 116 may be used to provide a search term used in one of the applications 112 to another one of the applications 112. Therefore, a user can switch between tabs in a window, windows in a user interface, and so on in which the switch results in a change between which application is configured to receive inputs from a user. In response, the search term may be automatically used to perform a search in that application. Thus, a user may efficiently switch between applications to have a search performed by the application, further discussion of which may be found in relation to FIG. 7.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Figure 2:
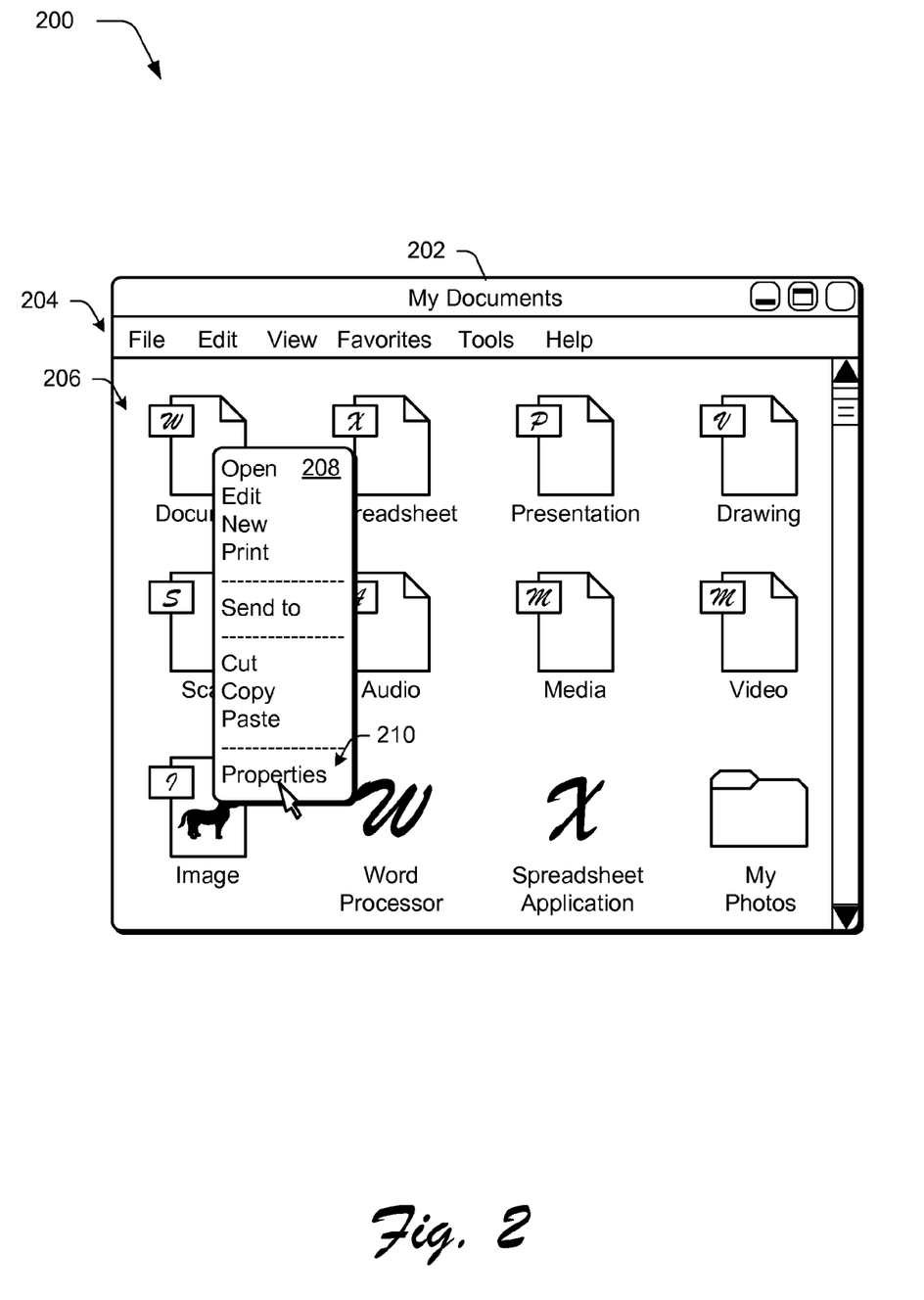
FIG. 2 is an illustration of a user interface in an example implementation configured to perform file management.

FIG. 2 is an illustration of a user interface 200 in an example implementation configured to perform file management. The user interface 200 as illustrated may be output by the computing device 102 and configured to perform file management techniques. For example, the file management module 106 may be incorporated as part of an operating system, an application that executes in conjunction with the operating system, a stand-alone application, and so on. Regardless of where incorporated, the file management module 106 may employ techniques to manage files 108, 118 accessible to the computing device 102 locally and/or remotely via the network 104, e.g., from the service provider 120.

The user interface 200 in this example is shown via a re-sizeable portion 202. The re-sizeable portion 202 is part of a file management user interface that is configured to navigate through hierarchies of folders to locate, organize, and manage files 108. The user interface 200, for instance, may include a menu bar 204 through which a user may access commands relating to management of files 108, such as copy, delete, rename, paste, cut, and so forth.

The user interface 200 also includes a plurality of representations 206 of files. Examples of representations of library files 110 include a document, spreadsheet, presentation, drawing, scan, audio, media, video, and image, although other types of library files are also contemplated. Representations of applications 112 (i.e., executable files) include a word processor and a spreadsheet application. Therefore, a library file may include any type of file that may be referenced by an executable file, e.g., a plug-in, document, and so on. Other representations may also be displayed in the user interface, an example of which is a folder titled "My Photos." Thus, the user interface 200 may be used to navigate through hierarchies of folders to locate, organize, and/or launch files 108 of interest.

The user interface 200 is also illustrated as displaying a menu 208 that includes a list of commands. The menu 208, for instance, may be configured as a context menu that includes representations of commands dependent upon a representation of a file that is associated with the menu 208. For example, a cursor control device may be used to "right click" a representation of the document to cause output of the menu 208 to include commands for that context, e.g., applicable to the document. The right click may be performed in a variety of ways, such as by clicking a right button of a cursor control device, a two-fingered tap-and-hold gesture, and so on. Thus, although this technique is referred to as a right click, this relates to a convention and is therefore not limited to actual right click performed using a button of a mouse or any other specific interaction, these being just examples thereof.

A cursor is illustrated as selecting one of the commands in the menu, which in this instance is labeled properties 210. In response to this selection, a command may be launched to output values of properties for the selected file, an example of which may found in relation to the following figure.

Figure 3:
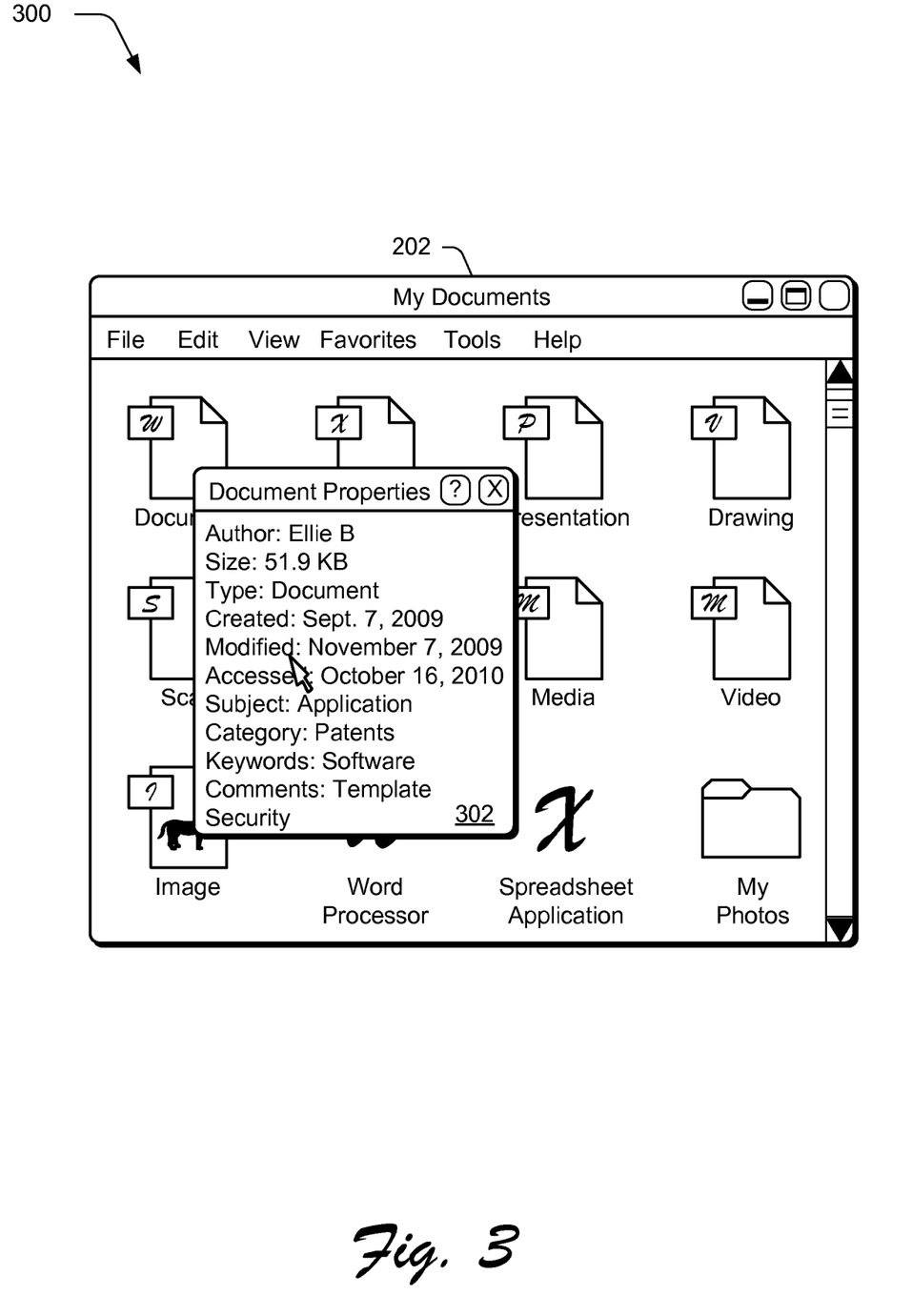
FIG. 3 is an illustration of a user interface in an example implementation in which a menu is output in response to selection of a properties command of FIG. 2.

FIG. 3 is an illustration of a user interface 300 in an example implementation in which a menu 302 is output in response to selection of a properties command of FIG. 2. The menu 302 includes a listing of properties and corresponding values for those properties. For example, the menu 302 lists an author, size, type, date created, date modified, date accessed, subject, category, keywords, comments, and security properties. Corresponding values are illustrated next to the respective properties, such as "author" and "Ellie B."

The menu 302 is configured such that the representations of the properties are selectable. Selection of the properties may then cause output of files that have corresponding values for the selected property. For example, a cursor is illustrated as selecting a property "modified" which has a corresponding value of "Nov. 7, 2010." The value and the property may then be used by the property module 114 to locate other files having a matching or similar value for that property. Similarity may be determined by the property module 114 in a variety of ways, e.g., similarity may be dependent on property type, individual implementations of a feature, and so on. Further discussion of example operation of the property module 114 may be found in relation to the following figure.

Figure 4:
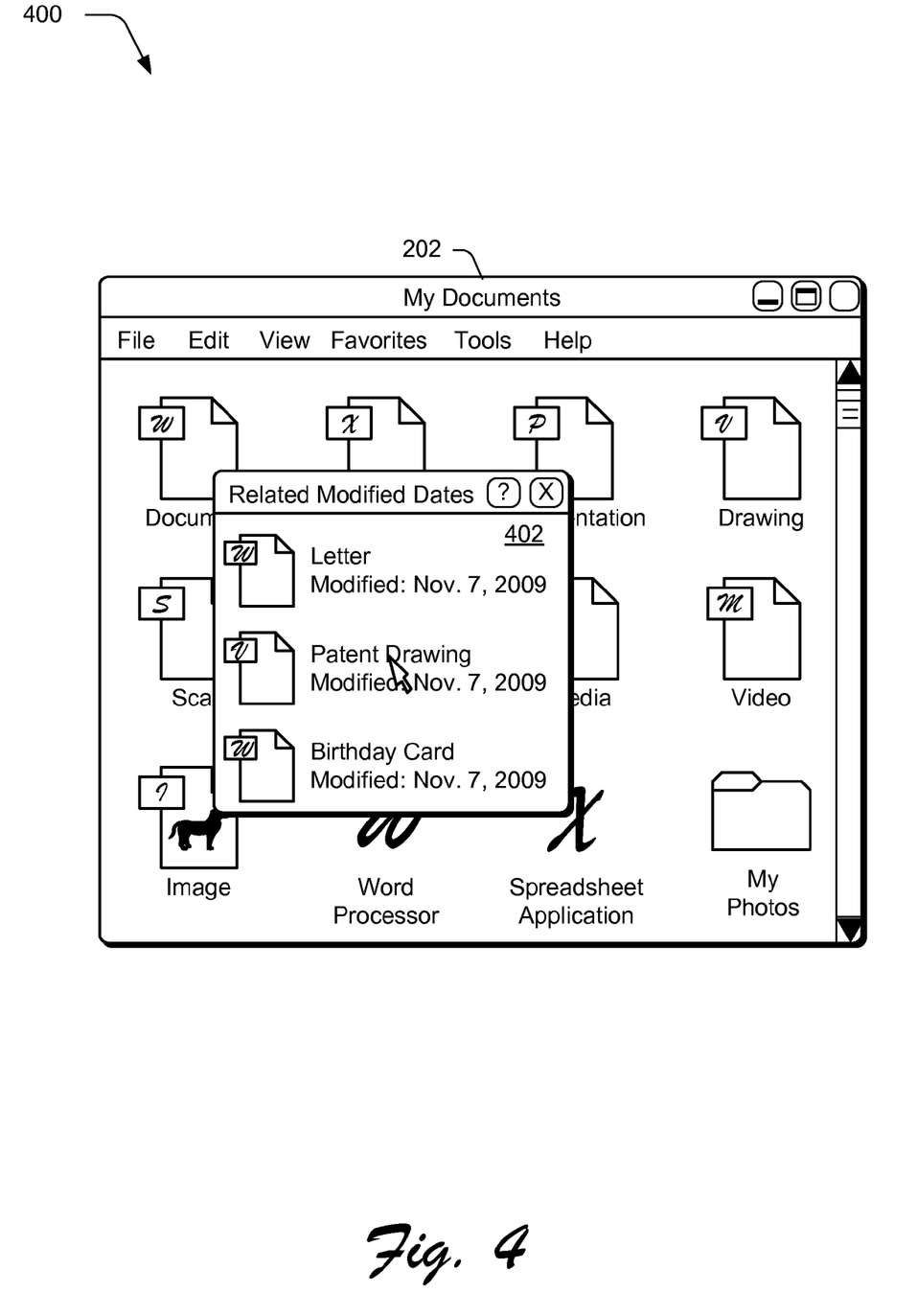
FIG. 4 is an illustration of a user interface in an example implementation in which files having a value for a property that corresponds to the selection made in the user interface of FIG. 3 are output.

FIG. 4 is an illustration of a user interface 400 in an example implementation in which files having a value for a property that corresponds to the selection made in the user interface of FIG. 3 are output. A menu 402 is output in this example which includes representations of files that are determined to correspond to the selection made in FIG. 3. In the illustrated example, the representations include an icon, a name of the file, and the corresponding property and value that was used to find a "match." Although a match is described, values of properties may correspond, one to another, in a variety of ways, such as by being similar in that the values are within a predefined range.

As illustrated, a variety of different types of files may be located using this pivot, examples of which include documents and drawings although other types are also contemplated. In an implementation, a user may select one or more of the representations to launch a corresponding file. For example, a user may "double click" an icon to launch a represented file. Other implementations are also contemplated. For example, the user may select the representation to cause output of other properties and corresponding values of a selected file, an example of which is shown in the following figure.

Figure 5:
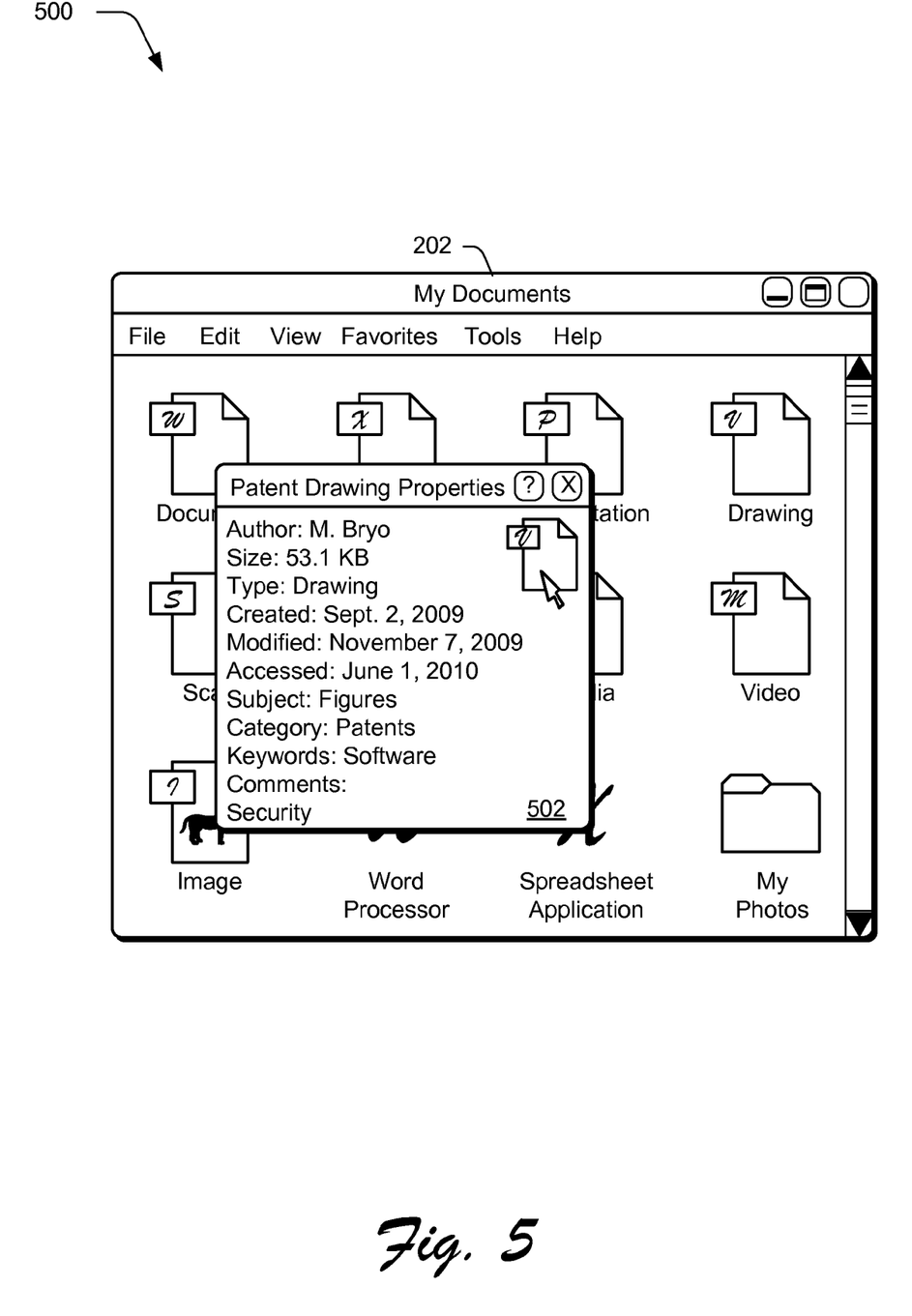
FIG. 5 is an illustration of a user interface in an example implementation in which properties for a file selected via the user interface of FIG. 4 are displayed.

FIG. 5 is an illustration of a user interface 500 in an example implementation in which properties for a file selected via the user interface of FIG. 4 are displayed. A menu 502 in this example is used to display properties of a representation of the file. The properties may be the same as or different from the properties displayed in the menu 302 of the user interface 300 of FIG. 3. For example, the properties may be displayed that have corresponding values, may include properties for which a value has not been provided (e.g., comments), may include properties particular to that type of file, and so on. In this example, the menu 502 includes an icon that is selectable to launch a corresponding file, although other examples are also contemplated. Thus, in this way properties of files may be used as pivots to efficiently locate a file of interest without navigating through a hierarchy of files and folders. Further discussion of use of properties as pivots may be found in relation to FIG. 6.

Although the preceding examples illustrated navigation through use of menus that were displayed over a user interface using non-modal techniques were described, a wide variety of other examples are also contemplated. For example, the user interface itself may be modal and change as selections are made by a user.

Example Procedures

The following discussion describes file management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the user interfaces 200-500 of FIGS. 2-5.

Figure 6:
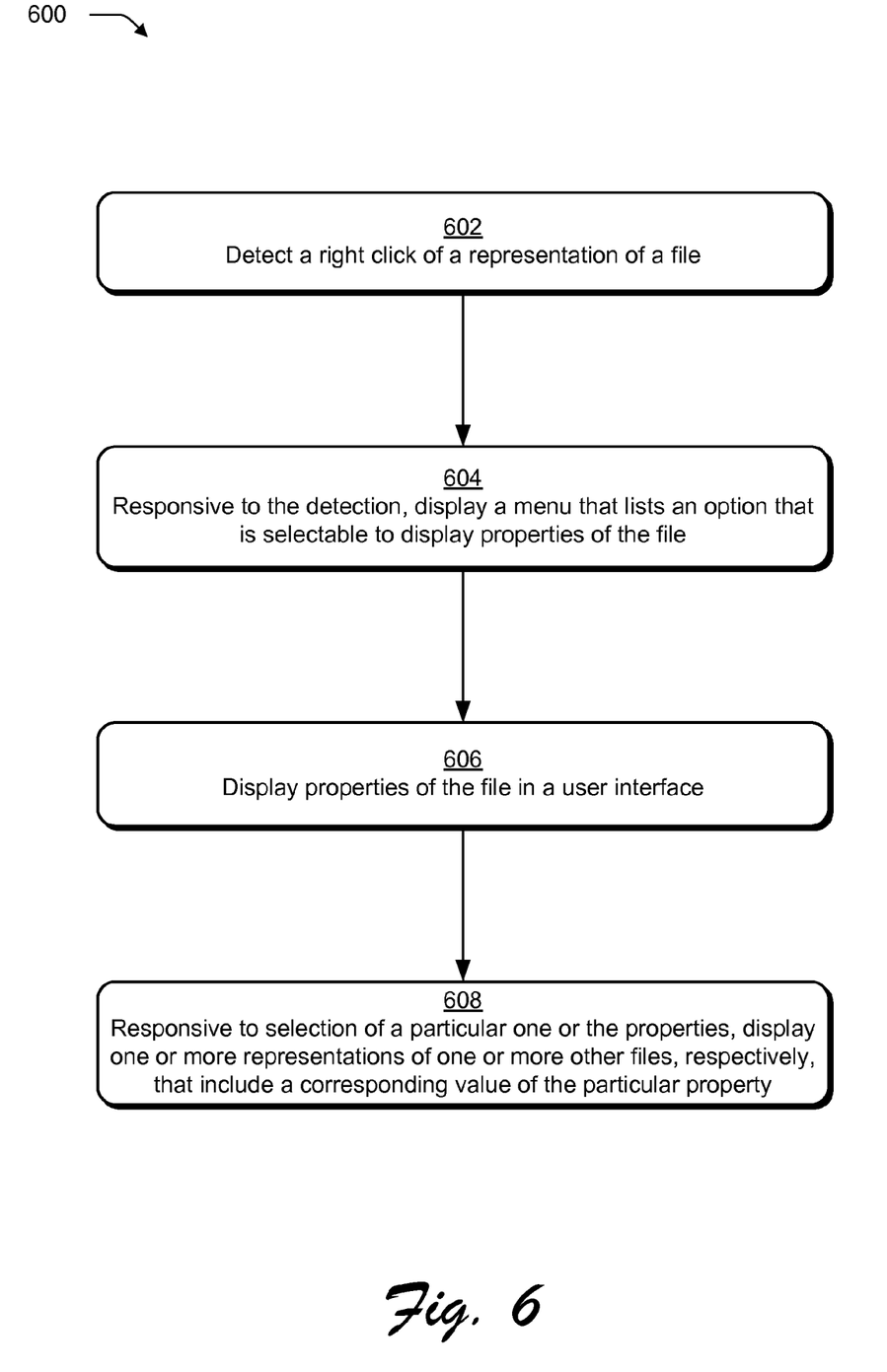
FIG. 6 is a flow diagram depicting a procedure in an example implementation in which properties are used as pivots to navigate through files in a user interface.

FIG. 6 depicts a procedure 600 in an example implementation in which properties are used as pivots to navigate through files in a user interface. A right click of a representation of a file is detected (block 602). A user, for instance, may perform a two-finger tap-and-hold gesture over a display the representation, make a gesture "in the air" that is captured by a camera as part of a natural user interface, through use of a mouse, stylus, and so forth. Additionally, the representation may be configured in a variety of ways, such as an icon, thumbnail, textual description, and so forth. As illustrated, the user may select a representation of a patent application document using the right click.

Responsive to the detection, a menu is displayed that lists an option that is selectable to display properties of the file (block 604). The menu 302, for instance, may be displayed as a pop-up menu that is displayed over the representation of the file in the user interface as described in relation to the previous block. Other examples are also contemplated, such as to replace the display of the representations of the files with the representations of commands and the option in the menu 302, and so forth.

The properties of the file are displayed in a user interface (block 606). A user, for instance, may select the option (e.g., "properties," "about," and so forth) to cause output of the properties of the file. The option may be accessed as part of a menu bar 202 or utilize other navigation and selection techniques. Continuing with the previous instance, the menu may display properties of the patent application document selected using the right click.

Responsive to selection of a particular one of the properties, one or more representations of one or more other files are displayed, respectively, that include a corresponding value of the particular property of the file (block 608). The user, for instance, may view properties of the patent application document and wish to locate other files that may be associated with the document, such as corresponding drawings for the application. Because the files have a likelihood of being modified on the same date, a user may select the "modified" property to locate other files that were modified on or near that date.

An example of this is shown in FIG. 4 in which representations of files that were modified on the same or nearly the same date are displayed. These representations include a letter, a patent drawing, and a birthday card. Thus, the user may quickly locate the drawings that correspond to the application without navigating through a hierarchy of folders, even if the drawings were misfiled in a different folder that is accessible to the computing device 102. In this way, the property module 114 of the file management module 106 of the computing device 102 may pivot on properties to navigate to a file of interest. Although pivots relating to properties have been described, a variety of other file management techniques may also be provided by the file management module 106 to manage files 108, an example of which is described in relation to the following figure.

Figure 7:
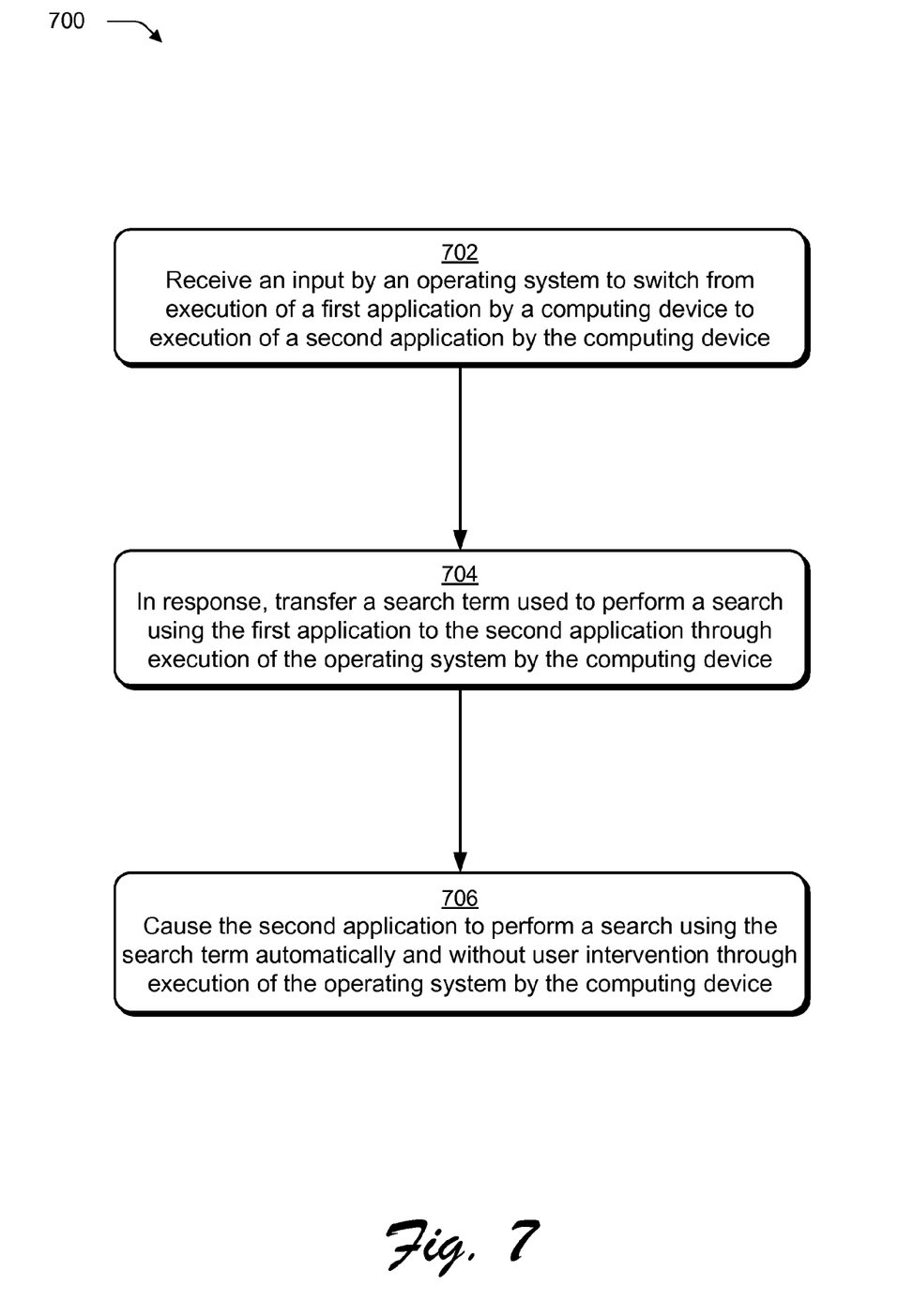
FIG. 7 is a flow diagram depicting a procedure in an example implementation in which search functionality is leveraged to automatically perform searches by switching between applications.

FIG. 7 depicts a procedure 700 in an example implementation in which search functionality is leveraged to automatically perform searches by switching between applications. An input is received by an operating system to switch from execution of a first application by a computing device to execution of a second application by the computing device (block 702). The input, for example, may involve switching from display of a first application executing on the computing device 102 to a display of a second application, such as by switching between tabs in a user interface, representations in a toolbar, between resizable and removable portions of a user interface, and so on to bring display of the second application "to the front" in a user interface. Other inputs are also contemplated, such as key combinations, launching of the second application through double-clicking a representation of the application, and so forth.

In response, a search term used to perform a search using the first application is transferred to the second application through execution of the operating system by the computing device (block 704). For example, a user may have entered the search term and performed a search using the first application 112, such as in a document. The user may then switch to another application to also have that search performed. In response, the operation system may cause the second application to perform the search using the search term automatically and without user intervention through execution of the operating system by the computing device (block 706). Thus, the user may switch between applications and have the search term entered and search without engaging in additional activities beyond the switch.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
responsive to a user selection of a properties option that is output in response to a selection of a representation of a file in a property user interface displaying properties of the file and associated values for the properties in the property user interface by a computing device; and
in response to a selection of a particular one of the properties of the file having a respective said associated value in the property user interface, locating one or more other files having a corresponding value of the particular property that matches the respective said associated value of the particular property of the file, and displaying one or more representations of the one or more other files in the property user interface that include the corresponding value that matches the respective said associated value of the particular property, respectively, of the file.

2. A method as described in claim 1, further comprising displaying properties of a particular one of the one or more other files in response to a selection of a corresponding said representation.

3. A method as described in claim 2, wherein the displaying of the properties of the particular said file includes displaying an option to launch the particular said file.

4. A method as described in claim 1, wherein the representation of the file is selectable via the property user interface via a first technique to launch the file and is selectable via a second technique to cause a menu to be displayed.

5. A method as described in claim 4, wherein the first technique is a double click and the second technique is a right click.

6. A method as described in claim 1, wherein the particular property is an author of the file.

7. A method as described in claim 1, wherein the particular property is a date at which the file was modified, a date at which the file was created, or a date at which the file was accessed.

8. A method as described in claim 1, wherein the file is a library file.

9. A method as described in claim 1, wherein the file is an executable file.

10. One or more computer readable storage media comprising instructions stored thereon that responsive to execution by a computing device, causes the computing device to perform operations comprising:
detecting a right click of a representation of a file in a property user interface;
responsive to the detecting, displaying an option that is selectable to display properties of the file;
responsive to a selection of the option, displaying a list of properties of the file and associated values of the properties in the property user interface; and
in response to a selection, via the property user interface and from the list of properties of the file, of one said property of the file having a respective said associated value, displaying one or more representations of one or more other files in the property user interface, respectively, that include a corresponding value for the selected one said property of the file that is within a predefined range of the respective said associated value of the selected one said property, of the file.

11. One or more computer readable storage media as described in claim 10, wherein the representation is an icon.

12. One or more computer readable storage media as described in claim 10, wherein the properties include author, a date at which the file was modified, a date at which the file was created, or a date at which the file was accessed.

13. One or more computer readable storage media as described in claim 10, wherein the file is a library file.

14. One or more computer readable storage media as described in claim 10, wherein the file is an executable file.

15. A hardware computing device comprising:
a file management module embodied within the hardware computing device, the file management module configured to:
responsive to a user selection of a properties option in a first list that is output in response to a selection of a representation of a file via a property user interface, display properties of the file and associated property values for the properties in a second list on the property user interface by a computing device; and
receive, via the property user interface, a selection from the second list of a particular one of the properties of the file having a respective said associated property value; and
in response to the selection of the particular one of the properties of the file, locate one or more other files having a corresponding value of the particular one of the properties that matches the respective said associated property value of the file in the property user interface; and
in response to location of the one or more other files, display in a third list one or more representations of the one or more other files that include the corresponding value that matches the respective said associated property value of the file in property user interface.

16. The hardware computing device as described in claim 15, wherein the file is located in a first folder, and wherein at least one of said other files is located in a second folder that is different than the first folder.

17. The hardware computing device as described in claim 15, wherein the one or more other files are located and displayed without navigating through a hierarchy of folders.

18. The hardware computing device as described in claim 15, wherein the file management module is further configured to locate at least one additional file having a value for the particular property that is within a predefined range of the respective said associated property value of the file, and display a representation of the additional file.

19. The hardware computing device as described in claim 15, wherein the particular property is a subject of the file, a category associated with the file, one or more comments associated with the file, or a security property.

20. The hardware computing device as described in claim 15, wherein the one or more representations of the one or more other files that include the corresponding value that matches the respective said associated property value of the file are selectable to cause output of additional properties and corresponding values of a respective one of said other files via the third list.

* * * * *